United States Patent
Meitav et al.

(10) Patent No.: US 7,927,736 B2
(45) Date of Patent: *Apr. 19, 2011

(54) ELECTROCHEMICAL ENERGY STORAGE DEVICE

(75) Inventors: Arieh Meitav, Rishon Le-Zion (IL); Joel Lang, Givatayim (IL); Niles Fleischer, Rehovot (IL); David Lifschitz, Jerusalem (IL); Eugene Pecherer, Netanya (IL); Eli Rosh Chodesh, Rishon Le Zion (IL); Joost Manassen, Rehovot (IL); Bharat Rawal, Surfside Beach, SC (US)

(73) Assignee: E.C.R.-Electro Chemical Research Ltd., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/611,996

(22) Filed: Nov. 4, 2009

(65) Prior Publication Data

US 2010/0047683 A1 Feb. 25, 2010

Related U.S. Application Data

(63) Continuation of application No. 11/981,518, filed on Oct. 31, 2007, now Pat. No. 7,687,198, which is a continuation of application No. 10/939,793, filed on Sep. 13, 2004, now Pat. No. 7,410,725, which is a continuation of application No. 09/723,353, filed on Nov. 27, 2000, now Pat. No. 6,790,556.

(60) Provisional application No. 60/168,761, filed on Dec. 6, 1999.

(51) Int. Cl.
*H01M 6/48* (2006.01)
*H01M 2/02* (2006.01)

(52) U.S. Cl. ........ 429/176; 429/178; 429/153; 429/163; 429/210

(58) Field of Classification Search ........................ None
See application file for complete search history.

(56) References Cited

U.S. PATENT DOCUMENTS

| | | | |
|---|---|---|---|
| 3,134,696 A | 5/1964 | Douglas et al. |
| 3,656,027 A | 4/1972 | Isley |
| 4,125,684 A | 11/1978 | Land |
| 4,204,036 A | 5/1980 | Cohen et al. |
| 4,488,203 A | 12/1984 | Muranaka et al. |
| 5,136,474 A | 8/1992 | Sarangapani et al. |

(Continued)

FOREIGN PATENT DOCUMENTS

EP 0975031 A1 1/2000

(Continued)

OTHER PUBLICATIONS

Medical Plastics and Biomaterials—The Role of Conductive Films in Fabricating Precision Components for Medical Electronic Devices, Jul. 1999.

(Continued)

*Primary Examiner* — John S Maples
(74) *Attorney, Agent, or Firm* — Dority & Manning, P.A.

(57) ABSTRACT

Apparatus and methodology subject matters relate to an improved electrochemical single or multi-cell energy storage device. Also, an outer casing may be provided as a pair of U-shaped shells, a single foil piece, or a tube-shaped structure which encases the internal electro chemical cell stack. The energy storage device and such casing when used advantageously exhibit low internal resistance, low ESR, a high voltage/capacity, and a low contact resistance between the internal stack and the outer casing.

24 Claims, 9 Drawing Sheets

U.S. PATENT DOCUMENTS

| | | | |
|---|---|---|---|
| 5,374,490 | A | 12/1994 | Aldecoa |
| 5,382,481 | A | 1/1995 | Fleischer |
| 5,512,391 | A | 4/1996 | Fleischer |
| 5,550,706 | A | 8/1996 | Kurzweil et al. |
| 5,556,627 | A | 9/1996 | LaFollette |
| 5,580,681 | A | 12/1996 | Fleischer |
| 5,585,209 | A | 12/1996 | Feldstein |
| 5,591,540 | A | 1/1997 | Louie et al. |
| 5,626,729 | A | 5/1997 | Thompson et al. |
| 5,646,815 | A | 7/1997 | Owens et al. |
| 5,728,485 | A | 3/1998 | Watanabe et al. |
| 5,728,489 | A | 3/1998 | Gao et al. |
| 5,729,424 | A | 3/1998 | Sharp et al. |
| 5,729,427 | A | 3/1998 | Li et al. |
| 5,729,428 | A | 3/1998 | Sakata et al. |
| 5,730,761 | A | 3/1998 | Lake et al. |
| 5,731,104 | A | 3/1998 | Ventura et al. |
| 5,731,105 | A | 3/1998 | Fleischer et al. |
| 5,733,683 | A | 3/1998 | Searson et al. |
| 5,736,275 | A | 4/1998 | Kaun |
| 5,751,541 | A | 5/1998 | Li et al. |
| 5,807,412 | A | 9/1998 | Li et al. |
| 5,847,920 | A | 12/1998 | Li et al. |
| 5,849,025 | A | 12/1998 | Owens et al. |
| 5,916,709 | A | 6/1999 | Arias et al. |
| 5,948,562 | A | 9/1999 | Fulcher et al. |
| 5,986,878 | A | 11/1999 | Li et al. |
| 6,225,009 | B1 | 5/2001 | Fleischer et al. |
| 7,410,725 | B2 | 8/2008 | Meitav et al. |
| 2008/0090141 | A1* | 4/2008 | Meitav et al. .................. 429/160 |

FOREIGN PATENT DOCUMENTS

| | | |
|---|---|---|
| JP | 52-050531 | 4/1977 |
| JP | 57-069720 | 4/1982 |
| JP | 62-022366 | 1/1987 |
| JP | 03-173111 | 7/1991 |
| JP | 03-241725 | 10/1991 |
| JP | 04-233170 | 8/1992 |
| JP | 4348016 A | 12/1992 |
| JP | 05-117882 | 5/1993 |
| JP | 06-005468 | 1/1994 |
| JP | 06-120080 | 4/1994 |
| WO | WO 9813887 | 4/1998 |

OTHER PUBLICATIONS

International Search Report for PCT International Application No. PCT/US00/42415, May 23, 2001.

Office Action for German Patent Application No. 100 85 271.8-45 dated Sep. 24, 2009 (translation not available).

Notice Regarding Prosecution Relative to Parent Application, Nov. 4, 2009.

English translation of JP 62-022366 patent abstract, Jan. 1987.
English translation of JP 03-173111 patent abstract, Jul. 1991.
English translation of JP 03-241725 patent abstract, Oct. 1991.
English translation of JP 04-233170 patent abstract, Aug. 1992.
English translation of JP 05-117882 patent abstract, May 1993.
English translation of JP 06-005468 patent abstract, Jan. 1994.
English translation of JP 06-120080 patent abstract, Apr. 1994.

* cited by examiner

| CAPACITOR TYPE | CAP. (mF) | VOLTAGE (V) | DIMEN. (mm) | ERS (mΩ) | CV/c.c. (mFV/c.c.) |
|---|---|---|---|---|---|
| TANTALUM | 0.47 | 6.3 | 6.0x7.0x3.5 | 100 | 20 |
| | 1.0 | 4.0 | 6.0x7.0x3.6 | 30 | 26 |
| ELECTROLYTIC ALUMINUM SOLID CAPACITOR ORGANIC SEMI-CONDUCTIVE ELECTROLYTE | 1.5 | 4.0 | φ10xL20 | 15 | 3.2 |
| | 2.2 | 4.0 | φ12.5xL22 | 10 | 3.3 |
| | 2.2 | 6.3 | φ16xL25 | 15 | 2.8 |
| ELECTROLYTIC CAPACITOR | 4.7 | 6.3 | φ16xL26 | 100 | 6 |
| | 15 | 6.3 | φ16xL35.5 | 30 | 13 |
| | 22 | 6.3 | φ18xL41 | 20 | 13 |
| | 15 | 10 | φ18xL35.5 | 30 | 17 |
| | 330 | 10 | φ76xL114 | 10 | 6 |
| BEST CAP™ | 250 | 8.0 | 52x50x4.4 | 50 | 150 |
| | 250 | 5.5 | 48x30x3.2 | 60 | 300 |
| | 500 | 5.5 | 48x30x5.6 | 30 | 350 |
| | 600 | 4.5 | 48x30x5.0 | 25 | 380 |
| | 700 | 3.5 | 48x30x4.5 | 20 | 400 |
| | 60 | 5.5 | 28x17x3.2 | 200 | 210 |
| | 120 | 5.5 | 28x17x5.5 | 100 | 250 |

*FIG. 7*

| FEATURE/MODEL# | 5.5/48x30-1 | 5.5/48x30-2 | 4.5/48x30-2 | 3.5/48x30-2 | 3.5/48x30-1 | 5.5/28x17-2 | 5.5/28x17-1 | 5.5/28x17-2 | 3.5/28x17-2 | 3.5/28x17-1 |
|---|---|---|---|---|---|---|---|---|---|---|
| NOMINAL VOLTAGE (V) | 5.5 | 5.5 | 4.5 | | 3.5 | 5.5 | 5.5 | 5.5 | 3.5 | 3.5 |
| CAPACITANCE(1) (mF) | 250 | 500 | 600 | | 700 | 60 | 120 | 200 | 60 |
| ESR(2) (mΩ) | 60 | 30 | 25 | | 20 | 200 | 100 | 70 | 100 |
| L.C.(3) (μA) | <10 | <20 | <10 | | <10 | <2 | <4 | <2 | <2 |
| CYCLE-LIFE(4) (#) | <10⁷ |||||||||
| DIMENSIONS (mm) L x W | 48x30 |||| 28x17 |||||
| H | 3.2 | 5.6 | 5.0 | | 4.5 | 3.2 | 5.5 | 4.0 | 1.8 |
| TEMPERATURE (°C) | −20°C−+60°C |||||||||

*FIG. 8*

CAPACITOR STACK

ELECTROCHEMICAL ENERGY STORAGE DEVICE

REFERENCE TO RELATED APPLICATIONS

This application is a continuation of U.S. patent application Ser. No. 11/981,518 filed Oct. 31, 2007, now U.S. Pat. No. 7,687,198, which is a continuation of U.S. patent application Ser. No. 10/939,793 filed Sep. 13, 2004, now U.S. Pat. No. 7,410,725, which is a continuation of U.S. patent application Ser. No. 09/723,353 filed Nov. 27, 2000, now U.S. Pat. No. 6,790,556, entitled: "Electrochemical Energy Storage Device Having Improved Enclosure Arrangement" and which claims priority to U.S. Provisional Patent Application No. 60/168,761 filed Dec. 6, 1999, entitled "Novel Enclosures for Electrochemical Capacitors and Batteries," all of which are fully incorporated herein by reference for all purposes.

BACKGROUND OF THE INVENTION

This subject matter generally relates to electrochemical systems for storage and release of electrical energy. In particular, the present subject matter relates to electrochemical systems for use in electronic circuits, for example, as capacitors or batteries. More particularly, the present subject matter relates to electrochemical systems for operation in electronic circuitry, for example, as capacitors or batteries, with either of a non-liquid, organic solution, aqueous solution or a protonic medium electrolyte material positioned between the electrodes.

Further still, the present subject matter relates to improved designs for bi-polar assemblies that address the deficiencies in existing bi-polar designs. In particular, this subject matter relates to an assembly of a plurality of single cells of an electrochemical system.

As electronic devices and other electrical apparatuses become increasingly more portable and provide more functionality, advances must be made in the devices of such devices that enable such portability. As is often the case with current electronics technology, the limiting factor in both size and functionality of an electronic apparatus is the size and weight of its component parts. In particular, the size and weight of its energy storage components. Additionally, the miniaturization of electronics has seen the push towards integrating various components into a single device to save both room and weight within both portable and stationary devices.

The current main energy source used for portable electronics is the electrochemical battery and/or the electro chemical capacitor. One of the limiting features of such current energy storage devices is the packaging of the electrochemical system. Prior art enclosures for flat and low height designs have suffered from several disadvantages. Coin cells for round shaped assemblies have needed to be crimped or swaged closed which requires expensive precision tooling. Further, such a method of enclosure requires accurate placement and/or control of closing pressures which can be very time consuming. Prismatic cell designs for rectangular and square shaped assemblies require precise corner radii and equivalent closing force across the entire area of the design to ensure good contact between the casing and the internal cells. While useful for their purpose, these prior art designs have forced higher production costs and longer production times due to the precision and technically complex assembly methods.

Further, in both coin and prismatic designs a grommet is needed to prevent shorting between the two poles of the electrochemical system. Should the electrochemical device consist of a plurality of cells in a stack then the grommet must serve to insulate the edge of the pack from the enclosure and insulate the two portions of the enclosure that contact the two poles of the device. Thus the grommet acts to prevent the manufacture of some desirable forms of connections to a plurality of cells.

It is, therefore, desirable to provide a multi-cell energy storage device which may comprise either an electrochemical capacitor, a double-layer capacitor or a battery. In an electrochemical capacitor version of the present subject matter, which may also be referred to as a pseudo-capacitor or batcap, the electrodes comprise material that may participate in reversible charge transfer reactions. Thus, a portion of the energy is stored in the double-layer at the surface of the electrodes and another portion is contributed by the charge transfer reactions. In a double-layer capacitor version of the present subject matter, essentially all of the energy is stored in the double layer at the surface of the electrodes. In a battery version of the present subject matter, the anode and cathode materials are specifically chosen so that each reacts during operation of the cell. The chemical energy that is stored in the electrodes is converted to electrical energy via charge transfer reactions of active materials. It is also desirable to provide a new packaging for an electrochemical single or multi-cell energy storage device wherein the cells in a multi-cell design may be in series, parallel or a combination thereof by virtue of the device's construction in one integrated structure.

SUMMARY OF THE INVENTION

The present subject matter recognizes and addresses various of the foregoing limitations and drawbacks, and others, concerning both the design of an electrochemical single or multi-cell energy storage device and methods of packaging the same. Therefore, the present subject matter provides an improved electrochemical single or multi-cell energy storage device and outer packaging for the same.

It is, therefore, a principle object of the present subject matter to provide an improved electrochemical single or multi-cell energy storage device. More particularly, it is an object of the present subject matter to provide an electrochemical single or multi-cell energy storage device within an improved casing. In such context, it is still a more particular object of the present subject matter to provide an electrochemical single or multi-cell energy storage device wherein the improved casing comprises a pre-formed metal sheet.

A bi-polar assembly, for use internal to stack of series bi-polar connected cells, comprises a bi-polar current collector, such as a single conductive carbon polymer matrix current collector. The bi-polar current collector within each bi-polar assembly need not have a metal film coating. On respective top and bottom sides of each bi-polar current collector in the recesses formed within perforated isolating frames may be placed a high surface area carbon-based electrode paste to form electrode plates.

The present subject matter equally relates to methodology as well as related apparatus subject matter. An exemplary embodiment of present apparatus relates to an energy storage device. Such energy storage device preferably may comprise an assembly of a plurality of cells electrically interconnected in series via a plurality of bi-polar current collectors; a terminal current collector associated with such assembly, such terminal current collector providing a first electrical contact; and a conductive outer casing surrounding and electrically connected to such assembly and serving as a second electrical contact.

In an alternative embodiment of such exemplary energy storage device, in such device, the first and second electrical contacts may comprise first and second external electrical contacts, respectively; and the conductive outer casing may comprise a metallic outer casing which is partially bowed so as to impart a spring-like loading thereto.

In another alternative embodiment of the first exemplary energy storage device, the first and second electrical contacts may comprise first and second external electrical contacts, respectively; and the terminal current collector may be multi-layered, and comprise a conductive polymer layer, which conductive polymer layer includes at least one of a conductive polymer, a polymer composite including a conductive filler, or a combination thereof.

Another present exemplary embodiment may relate to an electrochemical energy storage device, such as preferably comprising an assembly of a plurality of cells, at least selected ones of which are electrically interconnected in series via a plurality of bi-polar current collectors; a metallic outer casing surrounding such assembly and at least partially bowed so as to impart a spring-like loading to such casing; and at least one terminal current collector, electrically connected to such assembly and providing at least a first external electrical contact for such assembly.

In another exemplary embodiment of such electrochemical energy storage device, such device may further comprise potting material coating selected portions of such assembly; and with such outer casing electrically connected to such assembly so as to provide at least a second external electrical contact for such assembly; and with such terminal current collector multi-layered, and comprising a conductive polymer layer which includes at least one of a conductive polymer, a polymer composite including a conductive filler, or a combination thereof.

Another present exemplary embodiment may more particularly relate to a hybrid energy storage device. Such an exemplary device may comprise a first assembly of cells electrically interconnected in series; a second assembly of cells electrically interconnected in series; a terminal current collector associated with both such first assembly and such second assembly and providing a first common terminal therebetween; and a conductive outer casing surrounding and electrically connected to such first assembly and such second assembly. With such exemplary embodiment, preferably such first assembly, such terminal current collector, and such second assembly are mutually arranged in layers; and such outer casing providing a second common terminal electrically connecting such first assembly and such second assembly in parallel.

Yet another present exemplary electrochemical energy storage device, may comprise an assembly of a plurality of cells, at least selected ones of which are electrically interconnected in series via a plurality of bi-polar current collectors; and at least one terminal current collector, electrically connected to such assembly and providing at least a first external electrical contact for such assembly. In variations of such exemplary embodiment, such device may further include an outer casing surrounding such assembly. In other present alternatives of such device, such outer casing may comprise a variety of alternatives, one example of which comprises an at least partially bowed casing so as to impart a spring-like loading thereto.

An exemplary embodiment of present methodology relates to methodology for forming an energy storage device. Such exemplary method may comprise providing a plurality of cells; interconnecting the plurality of cells in series via a plurality of bi-polar current collectors to provide a connected series of cells in an assembly; associating a terminal current collector with the assembly, so as to provide a first electrical contact thereof; and surrounding the assembly with a conductive casing, electrically connected to the assembly, so as to provide a second electrical contact thereof.

Another present methodology relates to a method of forming an electrochemical energy storage device, comprising providing a plurality of cells; interconnecting at least selected ones of the plurality of cells in series via a plurality of bi-polar current collectors to provide a connected series of cells in an assembly; associating at least one terminal current collector electrically connected with the assembly, so as to provide a first external electrical contact thereof; and surrounding the assembly with a metallic outer casing, with such casing at least partially bowed so as to impart a spring-like loading thereto.

Yet another present exemplary method is for forming a hybrid energy storage device. Such an exemplary present method may comprise providing a first assembly of cells electrically interconnected in series; providing a second assembly of cells electrically interconnected in series; associating a terminal current collector with both the first assembly and the second assembly; connecting the first assembly, the terminal current collector, and the second assembly mutually arranged in layers; and surrounding both the first assembly and the second assembly with a conductive outer casing with the first and second assemblies electrically connected in parallel by the conductive outer casing.

Still another present method relates to a method of forming an electrochemical energy storage device. Such present exemplary method may preferably include providing a plurality of cells; interconnecting at least selected ones of the plurality of cells in series via a plurality of bi-polar current collectors to provide a connected series of cells in an assembly; and associating at least one terminal current collector electrically connected with the assembly, so as to provide a first external electrical contact thereof.

Additional present features may alternatively and/or further be practiced with the foregoing exemplary embodiments, whereby additional present embodiments are provided.

Additional objects and advantages of the present subject matter are set forth in, or will be apparent to those of ordinary skill in the art from, the detailed description as follows. Also, it should be further appreciated that modifications and variations to the specifically illustrated and discussed features and materials hereof may be practiced in various embodiments and uses of this subject matter without departing from the spirit and scope thereof, by virtue of present reference thereto. Such variations may include, but are not limited to, substitutions of the equivalent means, features, and materials for those shown or discussed, and the functional or positional reversal of various parts, features, or the like.

Still further, it is to be understood that different embodiments, as well as different presently preferred embodiments, of this subject matter, may include various combinations or configurations of presently disclosed features, elements, or their equivalents (including combinations of features or configurations thereof not expressly shown in the figures or stated in the detailed description).

These and other features, aspects and advantages of the present subject matter will become better understood with reference to the following description and appended claims. The accompanying drawings, which are incorporated in and constitute a part of this specification, illustrate an embodiment of the present subject matter and, together with the description, serve to explain the principles of the present subject matter.

In one exemplary embodiment, there may be provided a multi-cell capacitor which comprises a carbon/plastic composite film coated with a metallic film on its external side as a terminal current collector, a plurality of non-conductive pre-formed isolating frames and within the openings formed in each of the perforated isolating frames is present a high surface area carbon-based electrode to form capacitive electrode plates.

A bi-polar assembly, for use internal to a stack of series bi-polar connected cells, comprises a bi-polar current collector, such as a single conductive carbon polymer matrix current collector. The polymer current collector within the bi-polar assembly need not have a metal film coating. On respective top and bottom sides of each bi-polar current collector in the recesses formed within perforated isolating frames may be placed a high surface area carbon-based electrode paste to form electrode plates.

The capacitor device may be formed by stacking successive layers of a bi-polar current collector and electrodes, the electrodes being separated by proton conductive polymer membranes. The ends of the stacks are terminated with a terminal current collector. The membranes function as a proton conductive layer within each capacitor cell. The stack may be potted, along its periphery only, with an insulating material, such as but not limited to an epoxy, in order to maintain a good seal and prevent ingress of moisture from the ambient environment. An outer conductive casing, such as a pre-formed metal sheet, serves as a shell around the periphery potting material and is in physical contact with the terminal current collectors.

In such a multi-cell electrochemical energy storage device, closure may be made without the use of a grommet and there exists no need for crimping or swaging. The internal cells may be connected in a bi-polar design in series in order to increase the pack voltage. Alternatively, a tongue design may be used to combine two or more bi-polar stacks in parallel within a single casing in order to increase capacity and decrease internal resistance. The outer casing serves as a common pole for each of the stacks and the tongue as a common pole of the opposite polarity.

The casing may be a pair of U-shaped shells fitted over the epoxy-held internal stack or stacks and bonded along the adjoining sides of the shells. In an alternative exemplary embodiment, the casing may be a single sheet of pre-formed metal sheet bent approximate its midpoint to encase the epoxy-held internal stack and bonded along the adjoining ends of the foil sheet. In yet another exemplary embodiment, the casing may be a tube-shape. In any exemplary embodiment, the outer casing may be bent to form a pre-loaded structure that applies a spring-like loading to the shell in order to improve the contact between the shell and the stack and to offset thermal expansion cycles.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 7 is a table comparing conventional capacitor technology performance characteristics against those of a device made in accord with the present subject matter;

FIG. 8 is a table comparing performance characteristics of various electrochemical devices made in accord with the present subject matter.

Figure 1:
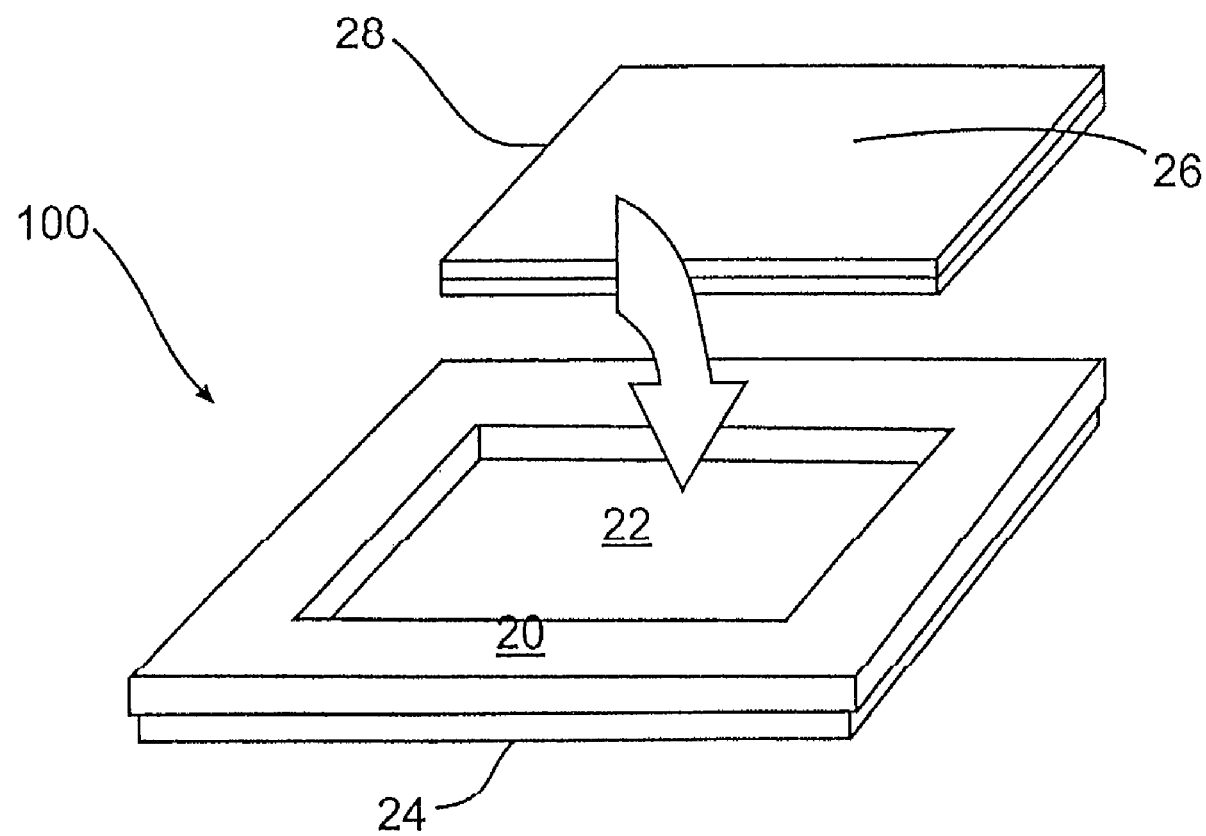
FIG. 1 is an exploded isometric view of the formation of the electrode plate in a perforated isolating frame with an affixed terminal current collector.

Repeat use of reference characters throughout the present specification and appended drawings is intended to represent the same or analogous features, elements, or steps of the present subject matter.

DETAILED DESCRIPTION OF THE PREFERRED EMBODIMENTS

Reference will now be made in detail to presently preferred embodiments of the present subject matter, examples of which are fully represented in the accompanying drawings. Such examples are provided by way of an explanation of the present subject matter, not limitation thereof. In fact, it will be apparent to those skilled in the art that various modifications and variations can be made in the present subject matter, without departing from the spirit and scope thereof. For instance, features illustrated or described as part of one embodiment can be used on another embodiment to yield a still further embodiment. Still further, variations in selection of materials and/or characteristics may be practiced, to satisfy particular desired user criteria. Thus, it is intended that the present subject matter cover such modifications and variations as come within the scope of the present features and their equivalents.

As disclosed above, the present subject matter is particularly concerned with an improved electrochemical single or multi-cell energy storage device wherein the cells are in series or parallel by virtue of the device's construction and an improved packaging therefore. The present subject matter is applicable to the generation of double-layer capacitors, pseudo-capacitors, and/or batteries, as well as, combinations thereof fabricated together or individually in a given assembly. For the sake of brevity, commonly-owned and assigned application entitled "ULTRA-THIN ELECTROCHEMICAL STORAGE DEVICES," filed on Nov. 21, 2000 and provided with a serial number U.S. Ser. No. 09/717,940, now U.S. Pat. No. 6,576,365, which claims priority to a common provisional application, is hereby incorporated fully by reference for all purposes.

In accord with the present subject matter, it is possible to fabricate such an electrochemical system with a low internal resistance by placing individual cells or bi-polar stacks in a common perforated isolating frame and connecting them with a series connection current collector that is not bi-polar. Within the system, the present subject matter provides greater versatility in achieving inter-cell or inter-subassembly connections in series, parallel or a combination thereof. Further, such systems may advantageously demonstrate a high voltage/capacitance value while maintaining a correspondingly low ESR and internal resistance.

FIG. 1 depicts a non-conductive perforated isolating frame 20. Such a frame 20 forms a cavity for the electrode. The frame 20 allows for a bi-polar stack or single cell subassemblies to be generated. The frame 20 may be generally rectangular or other shapes.

Additionally depicted in FIG. 1 is a current collector 24. The outer casing of the present subject matter functions as the current collector/external terminal of the device. Due to the planar geometry of the present subject matter the bi-polar electrical connections between cells and subassemblies require very good transverse conductivity. Additionally, the electrical connections need to be pressure insensitive. Conductive polymers and polymer composites have good transverse conductivity but poor lateral conductivity.

In one preferred embodiment, therefore, the current collector consists of two layers. The first layer is a conductive carbon layer which is in contact with the cell electrode. The second layer is a metal which is positioned between the first layer and the casing. A metal, metal alloy or metallic film displaying high conductivity and low contact resistance is preferred in order to increase the lateral conductivity of the current collector 24. Unfortunately, many metals that exhibit high lateral conductivity and low cost are not stable in the presence of the electrolytes commonly used in double-layer capacitors, pseudo-capacitors, and batteries. As a result, the preferred embodiment of the current collector 24 has a composite second layer comprising a conductive material which is stable when in proximity with such electrolytes and a metal or metallic film.

One exemplary such conductive material is a polymer film or a carbon/plastic composite film. The metal or metal alloy may be, but are not limited to, nickel, chromium, lead, tin, silver, titanium, brass, gold and/or copper. Either of the two materials of the preferred composite second layer may act as the base of the composite layer. The polymeric material may be deposited onto the metal base layer using, but not limited to, any of the following methods: screen printing, brush painting, propellant spraying/air brushing, or casting. Alternatively, the metal may be deposited onto the polymeric substrate base layer using, but not limited to, any of the following methods: vacuum deposition, flame spray coating, molten bath dipping, heat lamination, electroless deposition, electroplating, plasma deposition, sputtering, or propellant spray/air brushing in a carrier.

Alternatively, the current collector 24 may comprise any number of layers. The combination of layers and materials may be adjusted to achieve a desired combination of features including stability, lateral conductivity, interfacial contact resistance with the electrode, pressure insensitivity, solderability, creep, passivation, contact resistance, and permeability to the electrolyte, as well as, achieving the desired performance characteristics of the overall energy storage device.

In openings 22 within the common perforated isolating frames 20 may be placed a high surface area carbon-based paste 26. Such a paste 26 may work to form electrode plates 28. As shown in FIG. 1, showing one such assembly 100, placing such a paste 26 within the openings 22 of the perforated isolating frame 20 may result in the formation of electrode plates 28. The paste is preferably a combination of a carbon material mixed with an aqueous sulfuric acid. The sulfuric acid concentration may range from 1-8 molar and the carbon content of the electrode may range from 8 to 36 weight percent. Preferably the electrode thickness ranges from 30 to 300 microns.

In one exemplary embodiment of the electro chemical energy storage device, the electrodes comprise a high surface area carbon and a protonic medium. The protonic medium may be a material such as, but not limited to, water, aqueous acid solutions, sulfonic acids, poly-sulfonic acids such as polyvinyl sulfonic acid, protonic acids, compounds with one or more alcoholic hydroxyl groups, compounds with one or more carboxylic acid groups, compounds with one or more of the following groups: sulfonimides, —$PO_2H_2$, —$CH_2PO_3H_2$, —$OSO_3H$, -$OPO_2H_2$, —$OPO_3H_2$, —$OArSO_3H$), and combinations thereof.

Figure 2:
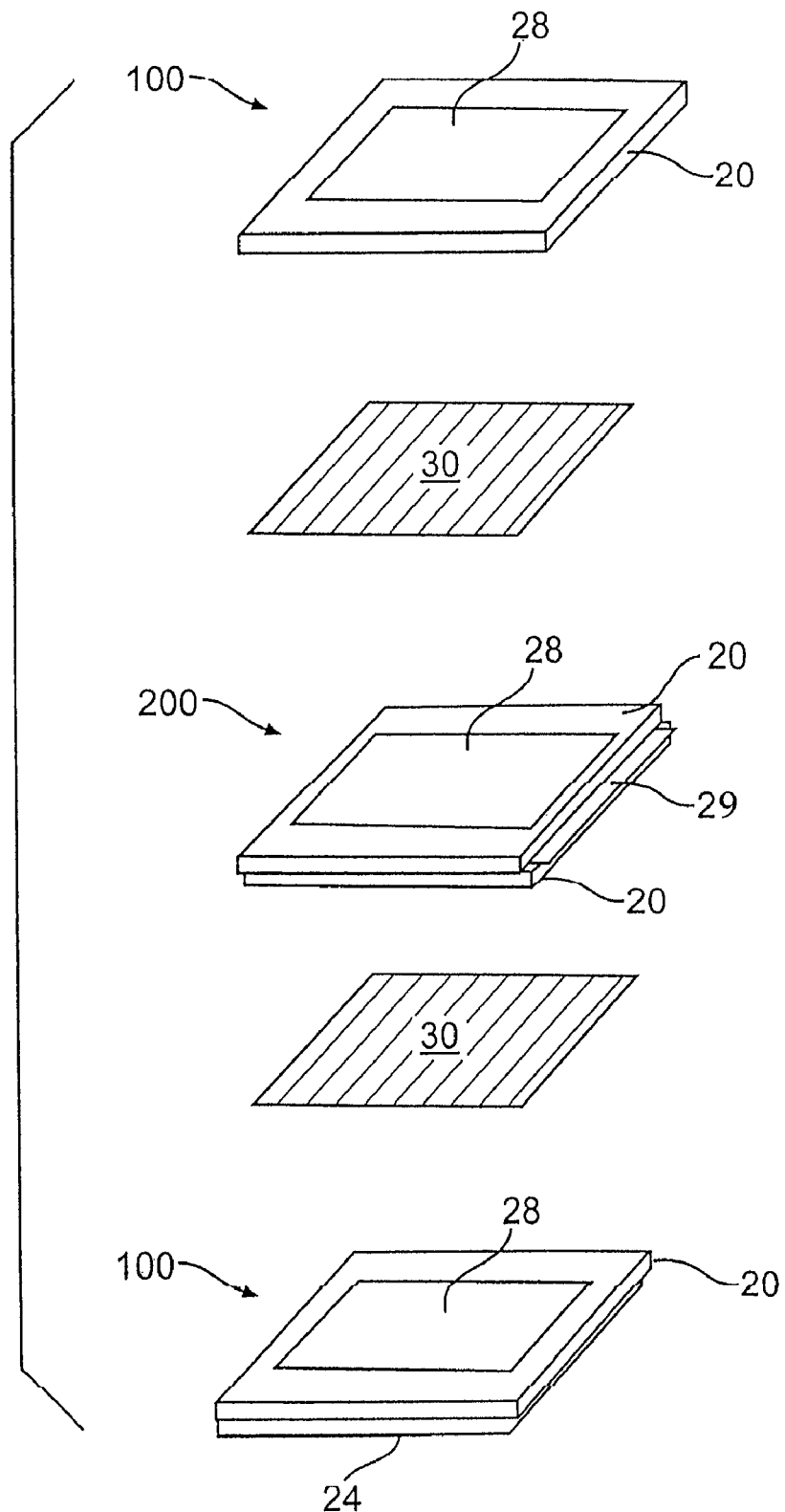
FIG. 2 is an exploded isometric view of one exemplary embodiment of a stack made in accordance with the present subject matter.

As shown in FIG. 2, a bi-polar assembly 200 can be formed by attaching two perforated isolating frames 20 to both sides of a single conductive polymer bi-polar current collector 29. On the top and bottom sides of the bi-polar assembly 200, the same carbon-based electrode paste 26 may be placed within the openings 22 to form electrode plates 28, similar to the electrode plates of the single pole assembly 100 as displayed in FIG. 1.

As shown in FIG. 2, a bi-polar assembly 200 can be formed by attaching two perforated isolating frames 20 to both sides of a single conductive polymer bi-polar current collector 29. On the top and bottom sides of the bi-polar assembly 200, the same carbon-based electrode paste 26 may be placed within the openings 22 of the isolating frames 20 to form electrode plates 28, similar to the electrode plates of the single pole assembly 100 as displayed in FIG. 1.

In one exemplary preferred embodiment an electrochemical multi-celled capacitor may be formed, as shown in FIG. 2, by utilizing two assemblies (as shown in FIG. 1) and a bi-polar assembly 200 with their respective electrode plates 28 by stacking the assemblies 100, 200 and 100, and separating them with proton conductive polymer membranes 30. The membranes 30 function as a proton conductive layer between electrode plates 28. The multi-celled capacitor may then be connected to a current collector 24 as described above.

Figure 3A:
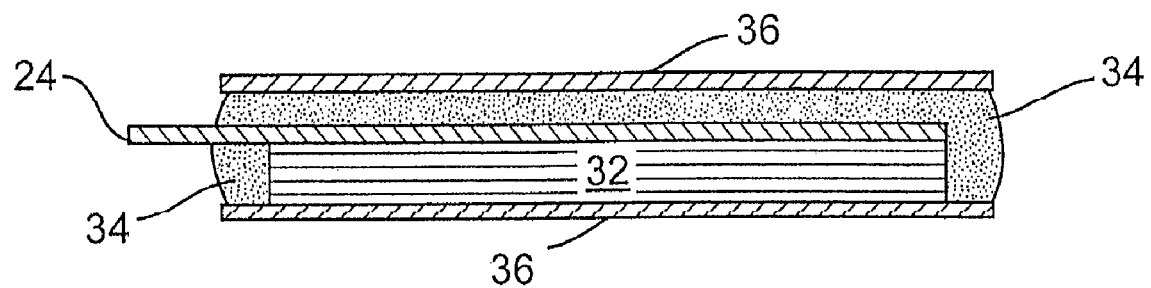
FIG. 3A is a cross-sectional view of an exemplary embodiment of a series connection among the cells of the internal stack in accord with the present subject matter.
Figure 3B:
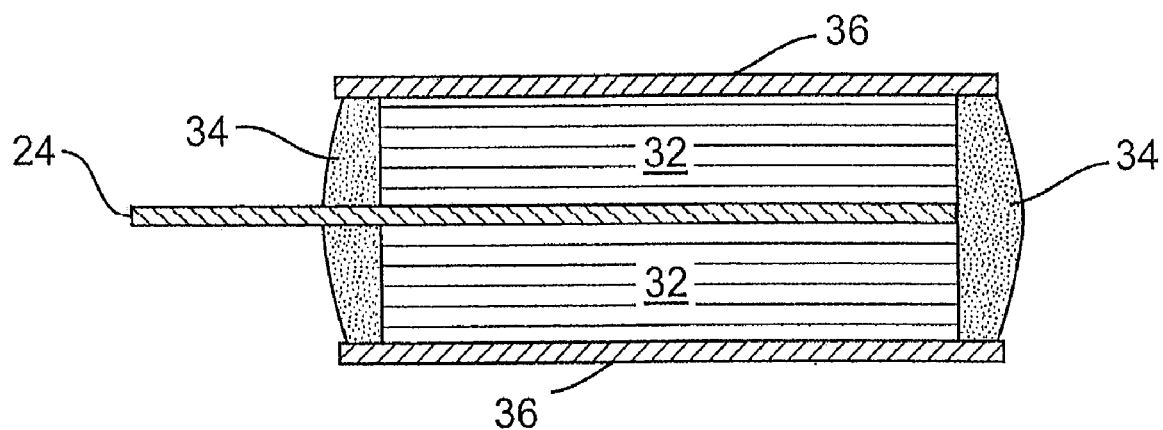
FIG. 3B is a cross-sectional view of the exemplary embodiment of FIG. 2 showing a parallel connection of two bi-polar internal stacks with tongue in accord with the present subject matter.

The entirety of the internal stack 32, as shown in FIGS. 3A and 3B, except for the side opposing the current collector 24 may then be potted or coated in a non-conductive material 34, including, but not limited to an epoxy material. The outer casing 36 may then be formed on both sides of the existing stack 32 and be placed in electrical connection with the non-epoxy coated side of the stack 32. (The method of preparing and forming the outer casing will be discussed in detail below.) Such a device can be seen in FIG. 3A.

FIG. 3B depicts a similar electrochemical device. In this alternative exemplary embodiment, there are two internal stacks 32 jointly connected to a current collector (a.k.a. a tongue) 24 in parallel. In this preferred embodiment, the internal stacks 32 (separated only by the current collector 24) may be coated only on their ends with the non-conductive epoxy 34. This leaves a point of connection for each stack 32 with the outer casing 36. Such a device enhances the capacity and reduces the ESR of the device.

The present subject matter is characterized by a bi-polar stack of a plurality of cells. The stack is potted with a sealing material, such as, but not limited to an epoxy, on its four peripheral edges. A pre-formed metal casing covers two opposing peripheral edges of the potted stack while maintaining good electrical contact with the terminal current collectors. The terminal collectors being located on the non-potted opposing faces of the stack. This provides the advantages of smaller volumes, more versatile electrical connections, ease of changing the size and number of cells in an assembly without expensive re-tooling, and the possibility to make hybrid systems of a battery or batteries and a capacitor or capacitors in one package.

The outer casing 36 of the present subject matter, regardless of shape or style, are pressed into continuous contact with the internal stack 32. Similarly, the preferable material for the outer casing 36 is a pre-formed metal sheet, including, but not limited to stainless steel. A pre-formed metal sheet is desirable to enhance the conductivity of the outer casing 36. Stainless steel is a preferred material due to its stability characteristics. Unfortunately, stainless steel generally has a layer of oxidation which needs to be removed. To aid in reducing such a stainless steel outer casing's resistance, once the oxidation layer has been removed from the surface of the casing 36, it is coated with a highly conductive material such as but not limited to gold, nickel, platinum, silver, lead, tin, or brass. The material may be attached in any of the known methods of coating a substrate with a metal including but not limited to sputtering or electro- or electroless plating.

When the internal stack 32 is housed in the outer casing 36 and such is pressed into contact with the internal stack 32 with sufficient force, the result is a flexible energy storage device which is small in size, easily adjusted to suit the thickness of the internal stack 32 and exhibits a low ESR, high capacity/voltage, and is extremely cost effective to manufacture. Additionally, such a flexible design allows for the use of the same pressure levels to generate differing size devices with identical performance characteristics.

Figure 4A:
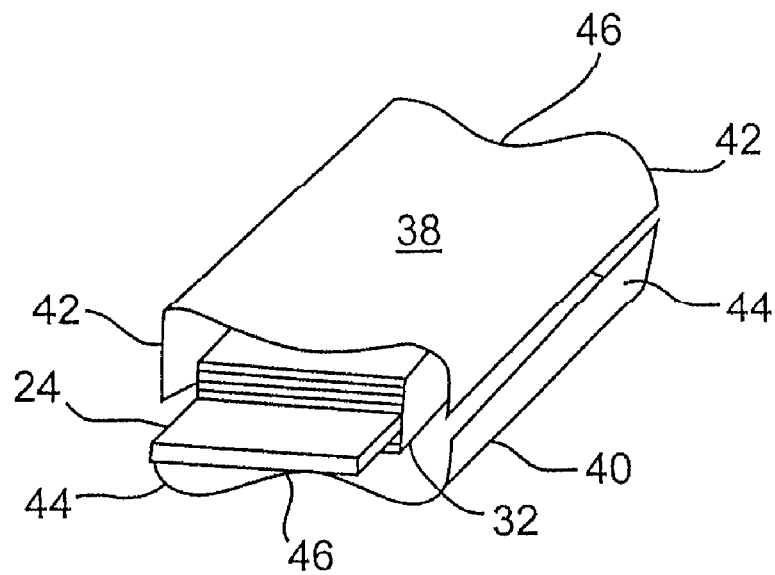
FIG. 4A is an isometric view of one exemplary embodiment of an outer casing comprising two pre-loaded U-shaped shells in accord with the present subject matter.
Figure 4B:
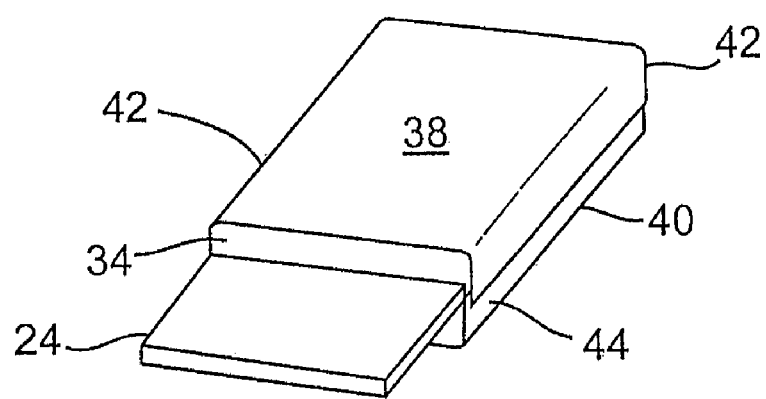
FIG. 4B is an isometric view of the outer casing of the exemplary embodiment in FIG. 4A after final assembly of the device.

FIGS. 4A and 4B depict one exemplary such outer casing 36 which comprises two U-shaped shells 38 and 40 before and after completion of the manufacture of the device. Each shell includes side portions 42 and 44 extending around the internal stack 32. The side portions 42 and 44 may be allowed to overlap along the side of the internal stack 32 so as to encase the same. The side portions 42 and 44 are then joined together along the overlap in order to complete the outer casing 36.

As shown in FIG. 4A, the U-shaped shells 38 and 40 may be bowed 46 slightly so as to incorporate a spring-like load into the shells. Once affixed around the internal stack 32, such a spring-like loading may allow the outer casing 36 to cope with thermal expansion cycling of the device during its operation.

Figure 5A:
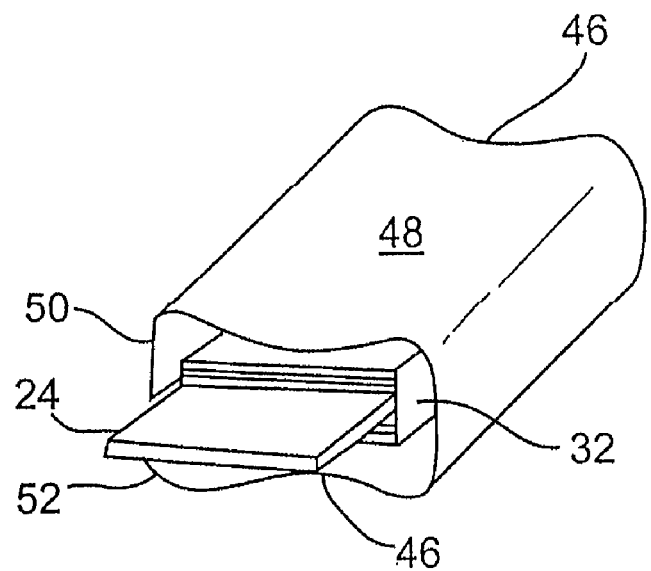
FIG. 5A is an isometric view of an alternative exemplary embodiment of an outer casing comprising a single sheet in accord with the present subject matter.
Figure 5B:
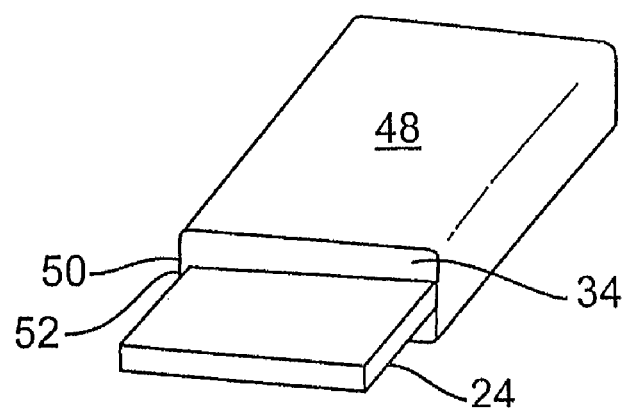
FIG. 5B is an isometric view of the outer casing of the exemplary embodiment in FIG. 5A after final assembly of the device.

Similarly, FIGS. 5A and 5B depict an alternative exemplary outer casing 36. In this exemplary embodiment, the outer casing 36 comprises a single sheet 48 of the pre-formed metal sheet with end portions 50 and 52. As in the previous embodiment, end portions 50 and 52 may be allowed to overlap each other when fitted around the internal stack 32. The end portions 50 and 52 are then joined along the length of the overlap to complete the construction of the device. Also as before, the outer casing 36 may be bowed 46 in order to incorporate the spring-like loading to counter thermal expansion cycling.

Figure 6:
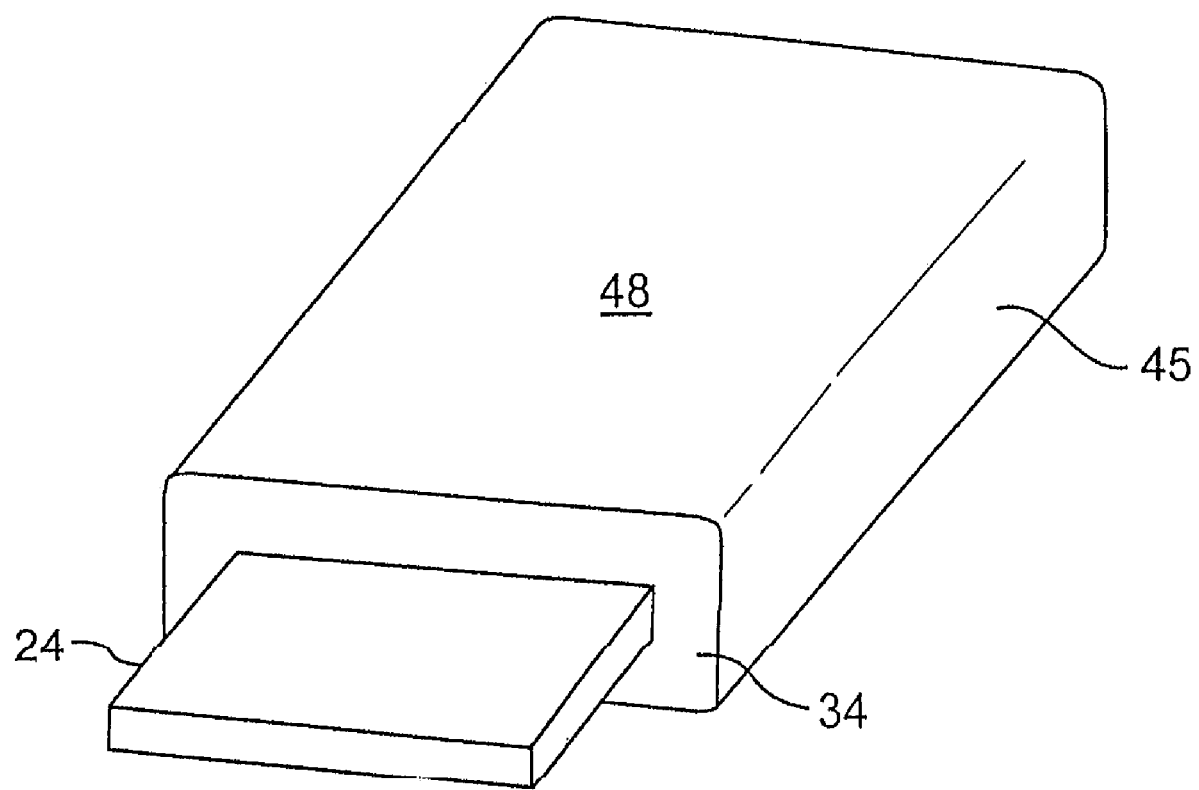
FIG. 6 is an isometric view of an alternative exemplary embodiment of an outer casing comprising a tube in accord with the present subject matter and after final assembly of the device.

As depicted in FIG. 6, a third exemplary embodiment of the outer casing 36 may be comprised of a seamless pre-formed metal tube structure 45. Similar to the preceding two exemplary embodiments, the multi-shell casing and the single sheet casing, the seamless pre-formed metal tube structure 45 encase the internal stack 32 and may incorporate a spring loading to offset the effects of thermal expansion.

FIG. 7 provides a table comparing various capacitors technologies with that made in accordance with the present subject matter and showing the variability of the physical characteristics and performance level of the present subject matter. Similarly, FIG. 8 provides a table comparing physical and performance characteristics of various electrochemical devices made in accord with the present subject matter.

Figure 9:
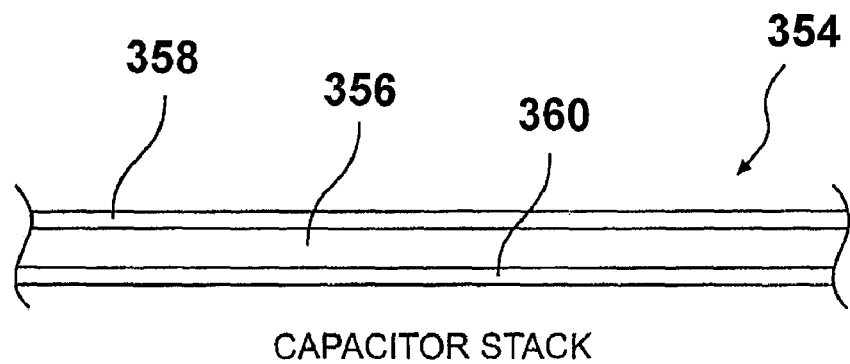
FIG. 9 is a cross-sectional view of an exemplary laminate outer casing of an exemplary embodiment of the present subject matter.

With reference to present FIG. 9, an exemplary present electrochemical energy storage device may be housed in an outer casing 354. Such exemplary casing 354 may in some embodiments preferably be a lightweight flexible non-conductive laminate. As represented in FIG. 9, such casing generally 354 may comprise a laminate of a non-conductive polyester material generally 356 with an outer metallic film generally 358 and an inner adhesive layer generally 360 to maintain contact with the internal assembly. By placing such exemplary metallic film generally 358 on such outer surface of exemplary casing 354, the chances of a short circuit may be reduced should the exemplary adhesive layer 360 degrade and allow contact between the representative non-conductive polyester 356 and the conductive film coating generally 352 on either of otherwise existing external current collector assemblies.

Alternatively, such exemplary non-conductive polyester material generally 356 may comprise the outer layer and the representative metallic film generally 358 may serve as a middle layer.

Still further, the device requires no outer casing at all and the otherwise existing external current collector assemblies may serve to function as the "outer casing" of exemplary present devices.

Figure 10:
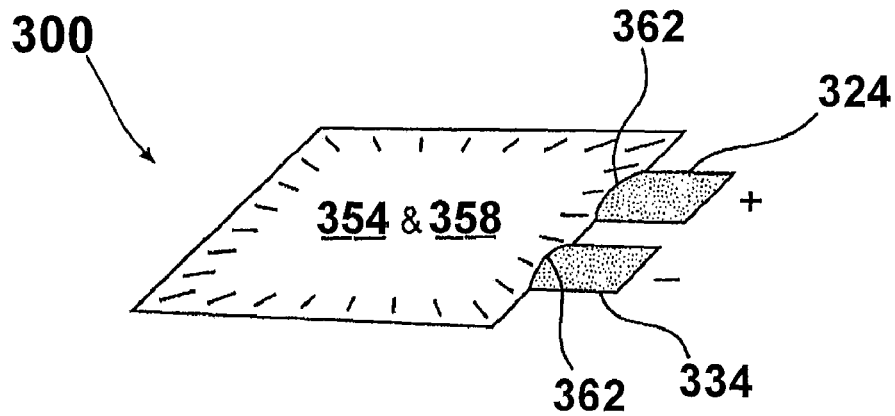
FIG. 10 is an isometric view of an exemplary embodiment of the present subject matter showing tab structures extending through the sealed edges of an exemplary device constructed in accordance with present subject matter.

As seen in an exemplary preferred embodiment of the present subject matter in FIG. 10, an exemplary internal ultra-thin electrochemical energy storage assembly generally 300 may be housed within a laminate casing 354. Such casing 354 may be hermetically sealed around substantially its entire outer periphery to encase the assembly. The exemplary openings 362 left or formed in the periphery may be for the passage of exemplary unitary tab structures 324 and 334. Such exemplary unitary tab structures 324 and 334 may serve as respective points or areas for electrical connection with external electronic components or circuitry. Such exemplary openings 362 may be sealed, such as with a pressure sensitive cold adhesive, thermal adhesive, or any other sealant sufficient to prevent loss of vapor from the solution within the electrochemical cells.

Figure 11:
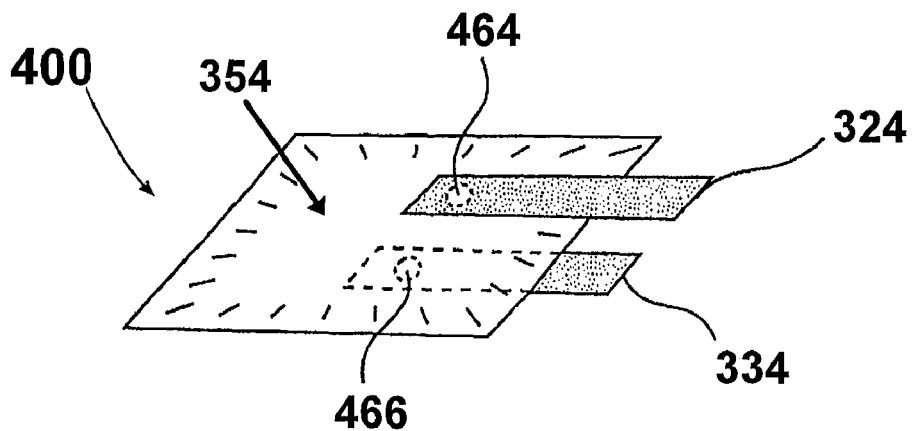
FIG. 11 is an isometric view of an alternative exemplary embodiment of the present subject matter showing tab structures in accordance with present subject matter as exemplary individual elements electrically connected to current collectors through exemplary pre-punched or pre-formed holes or openings in the face of the exemplary device's outer casing.

In an alternative exemplary preferred embodiment generally 400, as represented by present FIG. 11, the perimeter of exemplary laminate casing 354 may be completely hermetically sealed. In a face of the an exemplary laminate casing 354 may in such present alternative exemplary embodiment be provided two pre-punched or otherwise formed holes or openings 464 and 466 for respective electrical connection between the otherwise existing external terminal current collectors and the representative illustrated tab structures 324 and 334.

In such alternative embodiment, such exemplary tab structures 324 and 334 are separate and individual structures relative to otherwise existing external terminal current collectors. Their electrical connection through such pre-punched or pre-formed holes or openings 464 and 466 to otherwise existing external terminal current collectors may serve to further reduce the potential occurrence of short circuits and vapor loss which may occur with any openings 362 in the outer periphery of exemplary laminate casing 354. Additionally, such a methodology of connection enhances the ease of production and flexibility of tab structure positioning.

Although preferred embodiments of the present subject matter have been described using specific terms and devices, such description is for illustrative purposes only. The words used are words of description rather than of limitation. It is to be understood that changes and variations may be made by those of ordinary skill in the art without departing from the spirit or scope of the present subject matter, which is set forth in the following claims. In addition, it should be understood that aspects of various other embodiments may be interchanged, both in whole or in part. Therefore, the spirit and scope of the appended claims should not be limited to the description of the exemplary embodiments contained herein.

What is claimed is:

1. An energy storage device, comprising:
   an assembly of a plurality of cells electrically interconnected in series via a plurality of bi-polar current collectors;
   a terminal current collector associated with said assembly, said terminal current collector providing a first electrical contact that extends laterally from said assembly; and
   a conductive outer casing surrounding and electrically connected to said assembly and serving as a second electrical contact;
   wherein said conductive outer casing comprises a pre-formed stainless steel outer casing coated with at least one conductive metal.

2. An energy storage device as in claim 1, wherein:
   said at least one conductive metal coating said pre-formed stainless steel outer casing is selected from the group consisting of gold, nickel, platinum, silver, lead, tin and brass;
   said terminal current collector comprises a carbon/plastic composite film coated on at least one side with a metallic film; and
   said bi-polar current collectors comprise conductive polymer layers.

3. An energy storage device as in claim 1, wherein:
   said assembly comprises stacked cells comprising a top cell and a bottom cell, and wherein said terminal current collector is positioned intermediately between said top cell and said bottom cell, so that first and second cell groups are produced that share said terminal current collector as a common electrode, and so that said first and second cell groups are electrically connected in parallel by said outer casing; and
   said first and second cell groups individually comprise one of a double-layer capacitor, a pseudo-capacitor, or a battery.

4. An energy storage device as in claim 1, further comprising:
   potting material coating selected portions of said assembly; and
   wherein said assembly further comprises an electrode plate positioned on each side of each of the plurality of bi-polar current collectors;
   said outer casing comprises one of a tube, a single sheet, or a pre-formed metal sheet outer casing comprising two shells, each shell being U-shaped and including side portions opposing each other to form an open-ended box-shaped outer covering for said assembly, and wherein said side portions overlap each other and are joined together by welding; and
   said electrode plate comprises a non-conductive frame having at least one opening containing a conductive paste, which comprises a carbon material and protonic medium mixture, with said protonic medium selected from the group comprising water, aqueous acid solutions, sulfonic acids, poly-sulfonic acids, sulfonamides, and combinations thereof.

5. An energy storage device, comprising:
   an assembly of a plurality of cells electrically interconnected in series via a plurality of bi-polar current collectors;
   a terminal current collector associated with said assembly, said terminal current collector providing a first electrical contact that extends laterally from said assembly; and
   a conductive outer casing surrounding and electrically connected to said assembly and serving as a second electrical contact;
   wherein said bi-polar current collectors comprise conductive polymer layers; and
   said conductive outer casing comprises a metallic outer casing which is partially bowed so as to impart a spring-like loading thereto.

6. An energy storage device as in claim 5, wherein:
   said assembly of a plurality of cells comprises an arranged assembly of cells, said arranged assembly comprising a respective top cell group and a bottom cell group, and wherein said terminal current collector is positioned intermediately between said top cell group and said bottom cell group, so that first and second cell groups are produced that share said terminal current collector as a common electrode;
   said outer casing is electrically connected to said assembly so as to electrically connect said first and second cell groups in parallel; and
   said first and second cell groups individually comprise one of a double-layer capacitor, a pseudo-capacitor, or a battery.

7. An energy storage device as in claim 5, further comprising:
   potting material coating selected portions of said assembly; and
   wherein said terminal current collector comprises a carbon/plastic composite film coated on at least one side with a metallic film.

8. An energy storage device, comprising:
   an assembly of a plurality of cells electrically interconnected in series via a plurality of bi-polar current collectors;
   a terminal current collector associated with said assembly, said terminal current collector providing a first electrical contact that extends laterally from said assembly; and
   a conductive outer casing surrounding and electrically connected to said assembly and serving as a second electrical contact, wherein
   said first and second electrical contacts comprise first and second external electrical contacts, respectively;

said conductive outer casing comprises a metallic outer casing which is partially bowed so as to impart a spring-like loading thereto;

said plurality of current collectors comprise at least one external terminal current collector which provides for electrical connection of the device to external circuitry; and said terminal current collector is multi-layered, and comprises a conductive polymer layer, which conductive polymer layer includes at least one of a conductive polymer, a polymer composite including a conductive filler, or a combination thereof; and further including a second conductive structure on a side of said conductive polymer layer; and wherein said conductive polymer layer serves as a substrate, and said second conductive structure includes at least one layer of a metal, a metal alloy, a metallic film or a combination or mixture thereof as a facing on said substrate with said at least one layer of a metal, metal alloy, metallic film or a combination or mixture thereof including at least one of the group comprising nickel and copper;

said at least one layer of a metal, a metal alloy, a metallic film or a combination or mixture thereof is disposed onto said substrate by one of the group of techniques consisting of: vacuum deposition; flame spray coating; molten dip bath; heat lamination; electro-less deposition; electroplating; plasma deposition; sputtering; and propellant spray/air brush of metal particles in a carrier;

said plurality of cells respectively comprise a corresponding plurality of electrode pairs, and a plurality of proton conductive membranes, wherein each of said membranes is situated between a pair of opposing ones of said electrodes such that such pair of opposing electrodes and associated proton conductive membrane defines a cell;

said plurality of current collectors comprise at least one bi-polar current collector which remains internal to the device, at least one common current collector which provides external longitudinal electrical connection between in-plane cells, and external terminal current collectors which provide for electrical connection of the device to external circuitry; and at least one of said at least one common current collector and said external terminal current collectors further comprise a unitary extension tab structure.

9. An electrochemical energy storage device, comprising:
an assembly of a plurality of cells, at least selected ones of which are electrically interconnected in series via a plurality of bi-polar current collectors;
a metallic outer casing surrounding said assembly and at least partially bowed so as to impart a spring-like loading to said casing; and
at least one terminal current collector, electrically connected to said assembly and providing at least a first external electrical contact for said assembly; and
wherein said terminal current collector is multi-layered, and comprises a conductive polymer layer which includes at least one of a conductive polymer, a polymer composite including a conductive filler, or a combination thereof.

10. An electrochemical energy storage device as in claim 9, further comprising:
potting material coating selected portions of said assembly; and
wherein said outer casing is electrically connected to said assembly so as to provide at least a second external electrical contact for said assembly.

11. An electrochemical energy storage device as in claim 10, wherein said plurality of cells respectively comprise a corresponding plurality of electrode pairs, and a plurality of proton conductive membranes, and wherein each of said membranes is situated between a pair of opposing ones of said electrodes such that such pair of opposing electrodes and associated proton conductive membrane defines a cell.

12. An electrochemical energy storage device, comprising:
an assembly of a plurality of cells, at least selected ones of which are electrically interconnected in series via a plurality of bi-polar current collectors;
at least one terminal current collector, electrically connected to said assembly, and providing at least a first external electrical contact for said assembly that extends laterally from said assembly; and
a preformed stainless steel outer casing at least partially surrounding said assembly, coated with at least one conductive metal, and at least partially bowed so as to impart a spring-like loading thereto.

13. An electrochemical energy storage device as in claim 12, wherein said outer casing comprises one of:
an at least partly metallic casing;
a lightweight flexible non-conductive laminate;
a laminate of a non-conductive polyester material, further comprising an outer metallic film and an inner adhesive layer for maintaining contact with said assembly;
a laminate of polyester material, further comprising an outer layer of non-conductive polyester material and an intermediate metallic film layer;
a laminate hermetically sealed around substantially its entire outer periphery to encase the assembly, with openings formed in the periphery thereof, with said openings sealed against vapor loss from the interior of said electrochemical energy storage device, and with said storage device further including at least a pair of unitary tab structures, received in said openings of said casing periphery, and serving as respective points for electrical connection with external electronic components or circuitry;
a laminate hermetically sealed around its entire outer periphery to encase the assembly, with openings formed in a face thereof, and with said storage device further including at least a pair of unitary tab structures, received in said openings of said casing face, and serving as respective points for electrical connection with external electronic components or circuitry;
a casing electrically connected to said assembly so as to provide at least a second external electrical contact for said assembly;
a pre-formed metal sheet outer casing comprising two shells, each shell being U-shaped and including side portions opposing each other to form an open-ended box-shaped outer covering for said assembly, and wherein said side portions overlap each other and are joined together by welding;
an outer casing cleaned of any oxidation products, and further including a highly conductive metal coating thereon selected from the group consisting of gold, nickel, platinum, silver, lead, tin and brass; or
a pre-formed stainless steel outer casing comprising one of a pair of U-shaped shells, a single sheet, or a tube.

14. A method of forming an energy storage device, comprising:
providing a plurality of cells;
interconnecting the plurality of cells in series via a plurality of bi-polar current collectors to provide a connected series of cells in an assembly;

associating a terminal current collector with the assembly, so as to provide a first electrical contact thereof extending laterally from the assembly; and surrounding the assembly with a conductive casing, electrically connected to the assembly, so as to provide a second electrical contact thereof;

wherein the surrounding step includes surrounding the assembly with a pre-formed stainless steel casing coated with at least one conductive metal.

15. A method of forming an energy storage device as in claim 14, wherein:

the surrounding step further includes coating said conductive casing with at least one conductive metal selected from the group consisting of gold, nickel, platinum, silver, lead, tin and brass;

the associating step includes associating with the assembly a carbon/plastic composite film coated on at least one side with a metallic film; and the interconnecting step includes providing the plurality of bi-polar current collectors with conductive polymer layers.

16. A method of forming an energy storage device as in claim 14, wherein:

the providing and interconnecting steps result in stacked cells comprising a top cell group and a bottom cell group;

the associating step includes positioning said terminal current collector intermediately between said top cell group and said bottom cell group, so that first and second cell groups are produced that share said terminal current collector as a common electrode;

the surrounding step includes electrically connecting said first and second cell groups in parallel with said conductive casing; and the step of providing a plurality of cells includes providing first and second cell groups individually comprised of one of a double-layer capacitor, a pseudo-capacitor, or a battery.

17. A method of forming an energy storage device as in claim 14, further comprising:

providing potting material within selected portions of the assembly; and wherein the surrounding step includes surrounding the assembly with a conductive casing formed as one of a tube, a single sheet, or a pre-formed metal sheet outer casing comprising two shells, each shell being U-shaped and including side portions opposing each other to form an open-ended box-shaped outer covering for said assembly, and wherein said side portions overlap each other and are joined together by welding;

the interconnecting step further includes positioning an electrode plate on each side of each of the plurality of bi-polar current collectors;

the positioning an electrode plate step includes positioning a non-conductive frame having an opening, and filling such opening with a conductive paste; and the filling with a conductive paste step comprises filling with a carbon material and protonic medium mixture, where the protonic medium is selected from the group comprising water, aqueous acid solutions, sulfonic acids, poly-sulfonic acids, sulfonamides, and combinations thereof.

18. A method of forming an energy storage device, comprising:

providing a plurality of cells;

interconnecting the plurality of cells in series via a plurality of bi-polar current collectors to provide a connected series of cells in an assembly;

associating a terminal current collector with the assembly, so as to provide a first electrical contact thereof extending laterally from the assembly; and surrounding the assembly with a conductive casing, electrically connected to the assembly, so as to provide a second electrical contact thereof;

wherein the bi-polar current collectors comprise conductive polymer layers; and the surrounding step further includes providing a partially bowed outer casing as the conductive casing.

19. A method of forming an energy storage device as in claim 18, wherein:

the associating and surrounding steps include providing the first and second electrical contacts as first and second external electrical contacts, respectively;

the providing and interconnecting steps result in stacked cells comprising a top cell group and a bottom cell group;

the associating step includes positioning said terminal current collector intermediately between said top cell group and said bottom cell group, so that first and second cell groups are produced that share said terminal current collector as a common electrode;

the surrounding step includes electrically connecting said first and second cell groups in parallel with said conductive casing; and the step of providing a plurality of cells includes providing first and second cell groups individually comprised of one of a double-layer capacitor, a pseudo-capacitor, or a battery.

20. A method of forming an electrochemical energy storage device, comprising:

providing a plurality of cells;

interconnecting at least selected ones of the plurality of cells in series via a plurality of bi-polar current collectors to provide a connected series of cells in an assembly;

associating at least one terminal current collector electrically connected with the assembly, so as to provide a first external electrical contact thereof; and surrounding the assembly with a metallic outer casing, with such casing at least partially bowed so as to impart a spring-like loading thereto; and wherein the associating step further includes providing said terminal current collector as multi-layered, and comprising a conductive polymer layer which includes at least one of a conductive polymer, a polymer composite including a conductive filler, or a combination thereof.

21. A method of forming an electrochemical energy storage device as in claim 20, further comprising:

coating potting material on selected portions of said assembly; and wherein the surrounding step further includes electrically connecting said outer casing to said assembly so as to provide at least a second external electrical contact for said assembly.

22. A method of forming an electrochemical energy storage device as in claim 21, wherein the step of providing further includes providing said plurality of cells so as to respectively comprise a corresponding plurality of electrode pairs, and a plurality of proton conductive membranes, and wherein each of said membranes is situated between a pair of opposing ones of said electrodes such that such pair of opposing electrodes and associated proton conductive membrane defines a cell.

23. A method of forming an electrochemical energy storage device, comprising:
providing a plurality of cells;
interconnecting at least selected ones of the plurality of cells in series via a plurality of bi-polar current collectors to provide a connected series of cells in an assembly;
associating at least one terminal current collector electrically connected with the assembly, so as to provide a first external electrical contact thereof extending laterally from the assembly; and
providing a preformed stainless steel outer casing at least partially surrounding the assembly, coated with at least one conductive metal, and at least partially bowed so as to impart a spring-like loading thereto.

24. A method of forming an electrochemical energy storage device as in claim 23, wherein the surrounding step further includes providing the outer casing so as to comprise one of:
an at least partly metallic casing;
a lightweight flexible non-conductive laminate;
a laminate of a non-conductive polyester material, further comprising an outer metallic film and an inner adhesive layer for maintaining contact with said assembly;
a laminate of polyester material, further comprising an outer layer of non-conductive polyester material and an intermediate metallic film layer;
a laminate hermetically sealed around substantially its entire outer periphery to encase the assembly, with openings formed in the periphery thereof, with said openings sealed against vapor loss from the interior of said electrochemical energy storage device, and with said storage device further including at least a pair of unitary tab structures, received in said openings of said casing periphery, and serving as respective points for electrical connection with external electronic components or circuitry;
a laminate hermetically sealed around its entire outer periphery to encase the assembly, with openings formed in a face thereof, and with said storage device further including at least a pair of unitary tab structures, received in said openings of said casing face, and serving as respective points for electrical connection with external electronic components or circuitry;
a casing electrically connected to said assembly so as to provide at least a second external electrical contact for said assembly;
a pre-formed metal sheet outer casing comprising two shells, each shell being U-shaped and including side portions opposing each other to form an open-ended box-shaped outer covering for said assembly, and wherein said side portions overlap each other and are joined together by welding;
an outer casing cleaned of any oxidation products, and further including a highly conductive metal coating thereon selected from the group consisting of gold, nickel, platinum, silver, lead, tin and brass; or
a pre-formed stainless steel outer casing comprising one of a pair of U-shaped shells, a single sheet, or a tube.

* * * * *